United States Patent
Yaginuma et al.

(10) Patent No.: US 7,592,069 B2
(45) Date of Patent: Sep. 22, 2009

(54) SILICONE RUBBER COATING COMPOSITION AND AIRBAG

(75) Inventors: Atsushi Yaginuma, Gunma-ken (JP); Toshiyuki Ozai, Gunma-ken (JP); Toshio Yamazaki, Gunma-ken (JP); Masayuki Yoshida, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 644 days.

(21) Appl. No.: 10/934,355

(22) Filed: Sep. 7, 2004

(65) Prior Publication Data

US 2005/0054762 A1   Mar. 10, 2005

(30) Foreign Application Priority Data

Sep. 8, 2003   (JP) .............................. 2003-315024

(51) Int. Cl.
   *B32B 9/04* (2006.01)
(52) U.S. Cl. .................. 428/447; 524/492; 524/588; 525/477; 525/478; 528/15; 528/24; 528/31; 528/32; 528/34
(58) Field of Classification Search ........................ None
   See application file for complete search history.

(56) References Cited

U.S. PATENT DOCUMENTS

| | | | |
|---|---|---|---|
| 3,159,601 A | 12/1964 | Ashby | |
| 3,159,662 A | 12/1964 | Ashby | |
| 3,220,972 A | 11/1965 | Lamoreaux | |
| 3,775,452 A | 11/1973 | Karstedt | |
| 5,019,419 A * | 5/1991 | Matsumoto et al. | 427/96.2 |
| 5,254,621 A | 10/1993 | Inoue et al. | |
| 6,387,520 B1 | 5/2002 | Fujiki et al. | |
| 7,153,583 B2 * | 12/2006 | Azechi et al. | 428/447 |
| 2003/0104226 A1 | 6/2003 | Yaginuma et al. | |
| 2003/0211340 A1 * | 11/2003 | Ikeno et al. | 428/447 |
| 2005/0020754 A1 * | 1/2005 | Haas | 524/474 |

FOREIGN PATENT DOCUMENTS

| | | | |
|---|---|---|---|
| JP | 57-137355 | * | 8/1982 |
| JP | 05-025435 A | | 2/1993 |
| JP | 05-098579 A | | 4/1993 |
| JP | 10-204294 A | | 8/1998 |
| JP | 2001-059052 | | 3/2001 |
| JP | 2003-128919 | | 5/2003 |

OTHER PUBLICATIONS

Table 5.5. taken from "Handbook of Fillers, 2$^{nd}$ Edition" edited by Wypych Chem-Tec Publishing 1999.*

* cited by examiner

*Primary Examiner*—Marc S Zimmer
(74) *Attorney, Agent, or Firm*—Birch, Stewart, Kolasch & Birch, LLP.

(57) ABSTRACT

A silicone rubber coating composition comprising (A) a diorganopolysiloxane containing an average of at least two alkenyl groups, (B) silica powder having a specific surface area of at least 50 m$^2$/g, (C) an organosilicon compound containing a ureido group, an isocyanuric acid ester modified with an organosilicon compound or a (partial) hydrolytic condensate thereof, and (D) a curing agent is applied and vulcanized to base fabric to form a coated fabric, from which airbags are prepared. The composition has a sufficient adhesion to withstand high temperature and abrupt elongation upon inflation of the airbag even after long-term storage under hot humid conditions.

3 Claims, No Drawings

SILICONE RUBBER COATING COMPOSITION AND AIRBAG

CROSS-REFERENCE TO RELATED APPLICATION

This Nonprovisional application claims priority under 35 U.S.C. §119(a) on Patent Application No. 2003-315024 filed in Japan on Sep. 8, 2003, the entire contents of which are hereby incorporated by reference.

TECHNICAL FIELD

This invention relates to silicone rubber coating compositions for airbags, and airbags using the same to be installed on transportation vehicles. More particularly, it relates to a silicone rubber coating composition which has a sufficient adhesion to withstand high temperature and abrupt elongation upon inflation of an airbag even after long-term storage under hot humid conditions, and an airbag having a cured film of the composition.

BACKGROUND ART

Silicone rubber is widely used in a variety of applications due to excellent properties including heat resistance, freeze resistance, electrical insulation, flame retardance and compression set. Recently, airbags of silicone rubber-coated nylon fabric were marketed and are now used in the industry as a replacement of prior chloroprene rubber-coated bags.

The newest type airbag system is a side curtain sealed air bag which is designed for mitigating shocks to the passenger upon side collision or for preventing the passenger from being thrown out upon vehicle overturn. When inflated, the side curtain sealed air bag must keep a gas pressure (or internal pressure) generated by the explosion of an inflating agent for at least a certain time. Demanded is a coating agent having better adhesion than prior art coating agents. Since the airbag stays within the vehicle for a long period of time, long-term durability under hot humid conditions is one of important properties.

For airbags, several silicone rubber coating compositions are known. JP-A 5-25435 and JP-A 5-98579 corresponding to U.S. Pat. No. 5,254,621 propose coating compositions comprising an organosilicon compound having an epoxy group and an organosilicon compound having an isocyanate group as a tackifier, respectively. When airbags using these coating compositions are stored under hot humid conditions for a long period of time, the adhesion lowers, undesirably allowing for peeling.

SUMMARY OF THE INVENTION

An object of the present invention is to provide a silicone rubber coating composition for airbags which has a sufficient adhesion to withstand high temperature and abrupt elongation upon inflation of an airbag even after long-term storage under hot humid conditions, and an airbag having a cured film of the composition.

The inventor has discovered that the above-discussed problems are overcome by using a specific organosilicon compound. Namely, an airbag comprising a cured film of a silicone rubber coating composition comprising (A) a diorganopolysiloxane containing an average of at least two alkenyl groups on the molecule, (B) a finely divided silica having a specific surface area of at least 50 $m^2/g$, (C) an organosilicon compound containing a ureido group, an isocyanuric acid ester modified with an organosilicon compound or a (partial) hydrolytic condensate thereof, and (D) a curing agent has a sufficient adhesion to withstand high temperature and abrupt elongation upon inflation of the airbag even after the airbag is stored under hot humid conditions over a long period of time.

Accordingly, the present invention provides a silicone rubber coating composition for airbags, comprising
(A) 100 parts by weight of a diorganopolysiloxane containing an average of at least two alkenyl groups on the molecule,
(B) 0.1 to 100 parts by weight of a finely divided silica having a specific surface area of at least 50 $m^2/g$,
(C) 0.1 to 20 parts by weight of at least one compound selected from the group consisting of an organosilicon compound containing a ureido group on the molecule, an isocyanuric acid ester modified with an organosilicon compound and a (partial) hydrolytic condensate thereof, and
(D) an amount sufficient to cure the composition of a curing agent.

Also contemplated herein is an airbag comprising a base fabric and a cured film formed thereon from the silicone rubber coating composition.

Even after the airbag is stored under hot humid conditions over a long period of time, the coating composition keeps a sufficient adhesion to base fabric to withstand high temperature and abrupt elongation upon inflation of the airbag.

DESCRIPTION OF THE PREFERRED EMBODIMENTS

In the silicone rubber coating composition of the invention, component (A) is a diorganopolysiloxane containing an average of at least two silicon atom-bonded alkenyl groups on the molecule, serving as a base polymer. Suitable alkenyl groups are generally alkenyl groups of about 2 to 8 carbon atoms, preferably about 2 to 4 carbon atoms, such as vinyl, allyl, butenyl, pentenyl, hexenyl and heptenyl, with vinyl being most preferred.

The alkenyl groups may be bonded to silicon atoms, for example, at ends and/or side chains of the molecular chain. The diorganopolysiloxane (A) contains silicon atom-bonded organic groups other than the alkenyl groups. Suitable organic groups include unsubstituted or halo-substituted monovalent hydrocarbon groups of about 1 to 12 carbon atoms, preferably about 1 to 10 carbon atoms, for example, alkyl groups such as methyl, ethyl, propyl, butyl, pentyl, hexyl, cyclohexyl and heptyl, aryl groups such as phenyl, tolyl, xylyl and naphthyl, aralkyl groups such as benzyl and phenethyl, and halo-alkyl groups such as chloromethyl, 3-chloropropyl and 3,3,3-trifluoropropyl. Of these, methyl and phenyl are most preferred.

The content of alkenyl groups in component (A) is preferably 0.001 to 10 mol %, more preferably 0.001 to 5 mol %, based on all the silicon atom-bonded organic groups (or unsubstituted or substituted monovalent hydrocarbon groups).

Component (A) has a molecular structure which may be, for example, linear, linear with some branching, cyclic, or branched. A linear diorganopolysiloxane in which the backbone is essentially composed of repeating diorganosiloxane units and both ends of the molecular chain are capped with triorganosiloxy groups is preferred. Here, "organo" may refer also to alkenyl groups.

It is desirable for component (A) to have a viscosity at 25° C. of at least 100 mPa·s because the resulting composition is easy to handle and work with and the resulting silicone rubber has good physical properties. Oily organopolysiloxanes (e.g., a viscosity in a range of about 100 to 10,000,000 mPa·s, and preferably about 1,000 to 1,000,000 mPa·s) and gum-like organopolysiloxanes are included.

Illustrative examples of organopolysiloxanes (A) include dimethylsiloxane-methylvinylsiloxane copolymers capped at both ends of the molecular chain with trimethylsiloxy groups, methylvinylpolysiloxanes capped at both ends of the molecular chain with trimethylsiloxy groups, dimethylsiloxane-methylvinylsiloxane-methylphenylsiloxane copolymers capped at both ends of the molecular chain with trimethylsiloxy groups, dimethylpolysiloxanes capped at both ends of the molecular chain with dimethylvinylsiloxy groups, methylvinylpolysiloxanes capped at both ends of the molecular chain with dimethylvinylsiloxy groups, dimethylsiloxane-methylvinylsiloxane copolymers capped at both ends of the molecular chain with dimethylvinylsiloxy groups, dimethylsiloxane-methylvinylsiloxane-methylphenylsiloxane copolymers capped at both ends of the molecular chain with dimethylvinylsiloxy groups, dimethylpolysiloxanes capped at both ends of the molecular chain with trivinylsiloxy groups, and mixtures comprising at least two of the foregoing organopolysiloxanes.

Component (B) is finely divided silica which may be any known silica used as a reinforcing filler for silicone rubber. To this end, silica should have a specific surface area of at least 50 m²/g, and preferably 100 to 400 m²/g, as measured by the BET method. Exemplary silicas include fumed silica (also referred to as dry silica) and precipitated silica (also referred to as wet silica), with the fumed silica being preferred. The surface of silica may be subjected to hydrophobic treatment with suitable agents such as organopolysiloxanes, organopolysilazanes, chlorosilanes and alkoxysilanes. Any one or combinations of two or more of the foregoing silicas may be used.

An appropriate amount of finely divided silica (B) added is 0.1 to 100 parts by weight, preferably 1 to 50 parts by weight per 100 parts by weight of the organopolysiloxane (A). Less than 0.1 pbw of silica is too small to provide reinforcement whereas more than 100 pbw of silica makes the composition less workable and detracts from physical properties of the silicone rubber.

Component (C) is an organosilicon compound containing a ureido group on the molecule, or an isocyanuric acid ester modified with an organosilicon compound and/or a (partial) hydrolytic condensate thereof. One or more of these compounds may be used.

Suitable organosilicon compounds containing a ureido group on the molecule include, for example, 3-ureidopropyltrimethoxysilane, 3-ureidopropyltriethoxysilane, and 3-ureidopropylmethyldimethoxysilane, and partial hydrolytic condensates thereof (i.e., ureido group-containing organopolysiloxane in which at least one hydrolyzable group such as alkoxy is left on the molecule). Preferred are organosilicon compounds containing a ureido group and silicon atom-bonded alkoxy groups.

The preferred isocyanuric acid ester modified with an organosilicon compound and/or (partial) hydrolytic condensate thereof is an isocyanuric acid ester containing a silicon atom-bonded alkoxy group, represented by the general formula (I), such as an isocyanurate having one to three alkoxysilyl-substituted alkyl groups on the molecule and/or a (partial) hydrolytic condensate thereof (i.e., organopolysiloxane-modified isocyanuric acid ester).

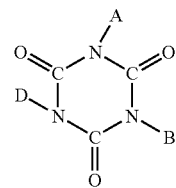

(I)

Herein A, B and D are each independently a monovalent hydrocarbon group or a group of the formula (II) or (III):

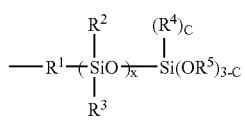

(II)

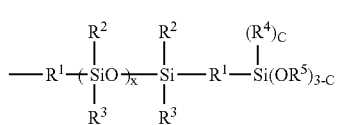

(III)

wherein $R^1$ is each independently a divalent $C_2$-$C_5$ hydrocarbon group, $R^2$, $R^3$, $R^4$ and $R^5$ are each independently a monovalent hydrocarbon group, x is an integer of at least 0, and c is equal to 0, 1 or 2, and at least one of A, B and D is a group of formula (II) or (III).

In formula (I), the monovalent hydrocarbon groups represented by A, B and D are preferably those of 1 to 10 carbon atoms, for example, alkyl groups such as methyl, ethyl, propyl, butyl, hexyl and octyl, cycloalkyl groups such as cyclohexyl and cyclopentyl, alkenyl groups such as vinyl, allyl, propenyl, and isopropenyl, aryl groups such as phenyl, tolyl and xylyl, aralkyl groups such as benzyl, phenylethyl, phenylpropyl and methylbenzyl, and substituted forms of the foregoing in which some or all of the hydrogen atoms are substituted with halogen atoms or the like, such as chloromethyl, 2-bromoethyl and 3,3,3-trifluoropropyl.

In formula (II), $R^1$ is a divalent $C_2$-$C_5$ hydrocarbon group, for example, an alkylene group such as methylene, ethylene, propylene or butylene. $R^2$, $R^3$, $R^4$ and $R^5$ are monovalent hydrocarbon groups, preferably of 1 to 10 carbon atoms, examples of which are as exemplified above for A, B and D. Preferred are alkyl groups such as methyl, ethyl, propyl and butyl, cycloalkyl groups such as cyclohexyl and cyclopentyl, alkenyl groups such as vinyl, allyl, propenyl, and isopropenyl, aryl groups such as phenyl, tolyl and xylyl, aralkyl groups such as benzyl, phenylethyl, phenylpropyl and methylbenzyl, and substituted forms of the foregoing in which some or all of the hydrogen atoms are substituted with halogen atoms or the like, such as chloromethyl, 2-bromoethyl and 3,3,3-trifluoropropyl. It is noted that $R^5$ is preferably a $C_1$-$C_6$ alkyl or alkenyl group. The subscript x is an integer of at least 0, preferably an integer of 0 to 6, and c is equal to 0, 1 or 2.

Illustrative of the isocyanuric acid esters modified with an organosilicon compound and (partial) hydrolytic condensate thereof are compounds of the following formulae (IV) to (IX).

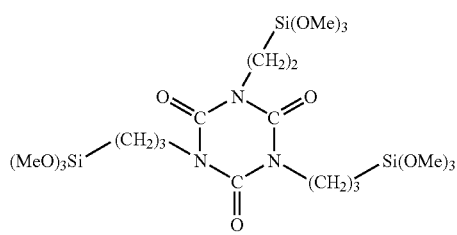

(IV)

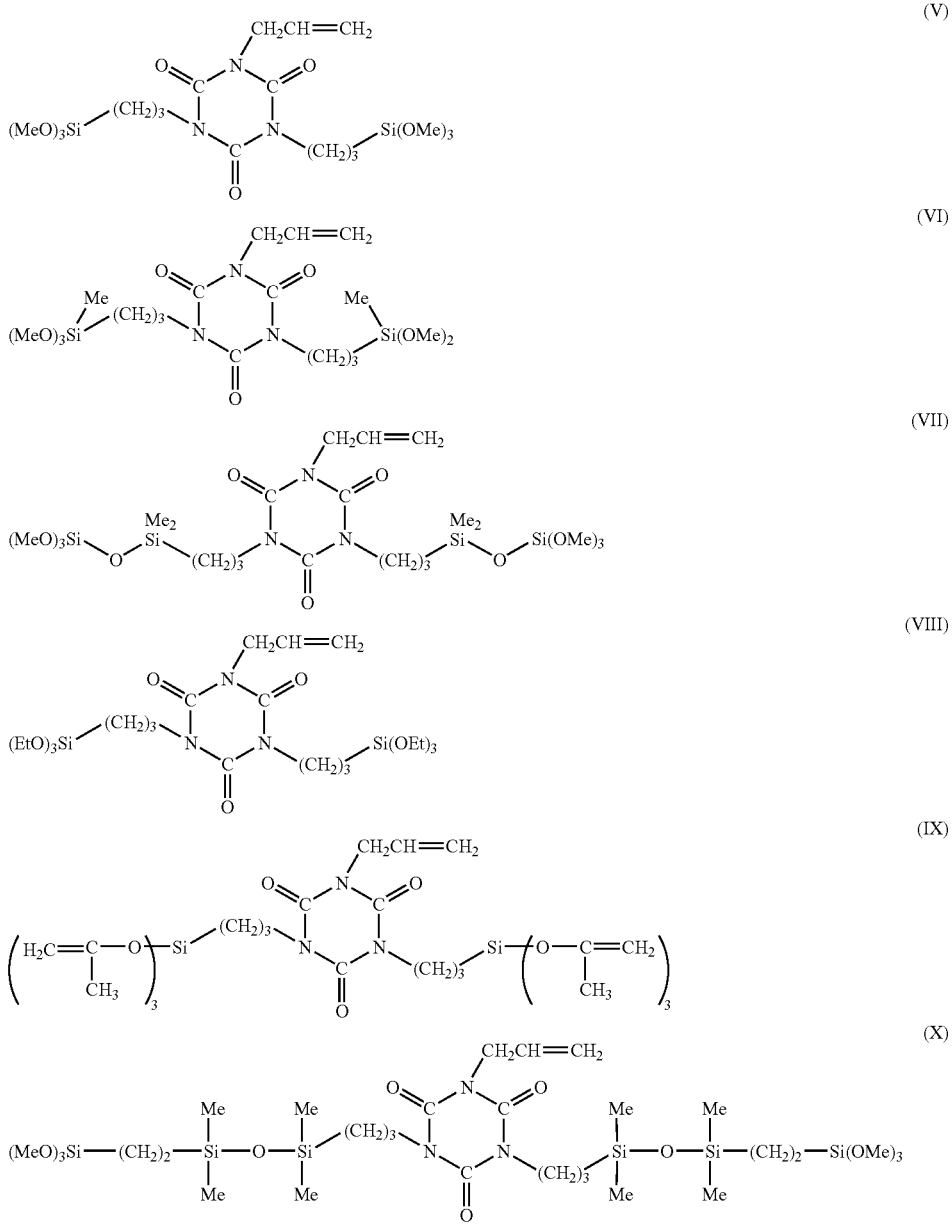

Note that Me is methyl and Et is ethyl.

An appropriate amount of component (C) blended is 0.1 to 20 parts by weight, preferably 0.2 to 5 parts by weight per 100 parts by weight of component (A). Too less amounts of component (C) fail to provide satisfactory adhesion whereas too much amounts achieve little extra effects.

Component (D) is a curing agent which is typically a catalyst or a combination of a catalyst and a crosslinking agent for causing the inventive composition to cure. There may be used any of curing agents which are used in conventional silicone rubber compositions for curing. Typical curing agents are combinations of a platinum group metal catalyst with an organohydrogenpolysiloxane containing at least two silicon atom-bonded hydrogen atoms on the molecule, and organic peroxides.

In the curing agents of the former type, the platinum group metal catalyst serves to promote addition reaction of silicon atom-bonded hydrogen atoms (i.e., SiH groups) in the organohydrogenpolysiloxane to alkenyl groups in component (A). Well-known catalysts for use in hydrosilylation reaction are useful. Exemplary catalysts include single platinum group metals such as platinum (inclusive of platinum black), rhodium and palladium; platinum chloride, chloroplatinic acid and chloroplatinic acid salts such as $H_2PtCl_4 \cdot nH_2O$, $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_4 \cdot nH_2O$, $PtCl_4 \cdot nH_2O$, $PtCl_2$, and $Na_2HPtCl_4 \cdot nH_2O$, wherein n is an integer of 0 to 6, preferably 0 or 6; alcohol-modified chloroplatinic acid (see U.S. Pat. No. 3,220,972); complexes of chloroplatinic acid with olefins (see U.S. Pat. No. 3,159,601, U.S. Pat. No. 3,159,662, U.S. Pat. No. 3,775,452); platinum group metals such as platinum black and palladium on carriers such as alumina, silica and carbon; rhodium-olefin complexes; chlorotris(triphenylphosphine)rhodium (known as Wilkinson catalyst); and complexes of platinum chloride, chloroplatinic acid or chloroplatinic acid salts with vinyl-containing siloxanes, especially vinyl-containing cyclic siloxanes. The catalyst may be used in a catalytic amount, and usually in an amount of about 0.1 to 500 ppm, preferably about 0.5 to 200 ppm of platinum group metal relative to the weight of component (A).

The organohydrogenpolysiloxane containing at least two, preferably at least three silicon atom-bonded hydrogen atoms (i.e., SiH groups) on the molecule may have a linear, branched or cyclic structure or be a resinous one of three dimensional network structure. Typical of the organohydrogenpolysiloxane are those having the average compositional formula (XI):

$$H_a R^6_b SiO_{(4-a-b)/2} \quad (XI)$$

wherein $R^6$ is each independently a substituted or unsubstituted monovalent hydrocarbon group free of aliphatic unsaturation, "a" and "b" are numbers satisfying $0<a<2$, $0.8 \leq b \leq 2$ and $0.8<a+b \leq 3$, preferably $0.05 \leq a \leq 1$, $1.5 \leq b \leq 2$ and $1.8 \leq a+b \leq 2.7$.

In formula (XI), the substituted or unsubstituted monovalent hydrocarbon groups free of aliphatic unsaturation represented by $R^6$ include those of 1 to 10 carbon atoms, preferably 1 to 7 carbon atoms, for example, alkyl groups such as methyl, ethyl, propyl, butyl, pentyl, hexyl, cyclohexyl and heptyl, aryl groups such as phenyl, tolyl, xylyl and naphthyl, aralkyl groups such as benzyl and phenethyl, and halogenated alkyl groups such as chloromethyl, 3-chloropropyl and 3,3,3-trifluoropropyl. Of these, lower alkyl groups of 1 to 3 carbon atoms such as methyl, ethyl and propyl, phenyl and 3,3,3-trifluoropropyl are preferred.

The hydrogen atom (bonded to a silicon atom) in the organohydrogenpolysiloxane may be bonded to any of silicon atoms at ends or intermediate positions of the molecular chain or both. The organohydrogenpolysiloxane contains per molecule at least two hydrogen atoms, preferably at least three hydrogen atoms, typically 3 to 200 hydrogen atoms, and more preferably 3 to about 100 hydrogen atoms. The number of silicon atoms per molecule is typically 2 to about 300, preferably 3 to about 200, and more preferably 4 to about 100.

Examples of the organohydrogenpolysiloxane include siloxane oligomers such as 1,1,3,3-tetramethyldisiloxane, 1,3,5,7-tetramethyltetracyclosiloxane, and 1,3,5,7,8-pentamethylpentacyclosiloxane; both end trimethylsiloxy-capped methylhydrogenpolysiloxane, both end trimethylsiloxy-capped dimethylsiloxane-methylhydrogensiloxane copolymers, both end silanol-capped methylhydrogenpolysiloxane, both end silanol-capped dimethylsiloxane-methylhydrogensiloxane copolymers, both end dimethylhydrogensiloxy-capped dimethylpolysiloxane, both end dimethylhydrogensiloxy-capped methylhydrogenpolysiloxane, both end dimethylhydrogensiloxy-capped dimethylsiloxane-methylhydrogensiloxane copolymers; and silicone resins comprising $R_2(H)SiO_{1/2}$ units and $SiO_{4/2}$ units and optionally, $R_3SiO_{1/2}$ units, $R_2SiO_{2/2}$ units, $R(H)SiO_{2/2}$ units, $(H)SiO_{3/2}$ units or $RSiO_{3/2}$ units wherein R is as defined above for $R^2$.

The organohydrogenpolysiloxane is preferably used in such amounts that 0.5 to 10 moles, more preferably 0.8 to 5 moles of silicon atom-bonded hydrogen atoms (i.e., SiH groups) in the organohydrogenpolysiloxane are present per mole of alkenyl groups in the alkenyl-containing diorganopolysiloxane (A).

The curing agent of the latter type is an organic peroxide. Typical examples include ketone peroxides, hydroperoxides, diacyl peroxides, dialkyl peroxides, preoxy ketals, alkyl peresters, and percarbonates. Preferred among others are diacyl peroxides such as benzoyl peroxide, 2,4-dichlorobenzoyl peroxide, p-methylbenzoyl peroxide, o-methylbenzoyl peroxide, p-chlorobenzoyl peroxide, and o-chlorobenzoyl peroxide.

When the organic peroxide is used as the catalyst, it is preferably compounded in an amount of 0.01 to 20 parts by weight, more preferably 0.1 to 10 parts by weight per 100 parts by weight of component (A) for a good balance of storage stability and curability of the composition.

In the organic peroxide system, an organohydrogenpolysiloxane containing at least two silicon atom-bonded hydrogen atoms on the molecule as defined above may be added for the purpose of helping the silicone rubber to crosslink by way of the organic peroxide. To this end, the organohydrogenpolysiloxane is added in an amount of up to 20 parts by weight (i.e., 0 to 20 parts by weight), preferably 0.5 to 20 parts by weight, more preferably 1 to 10 parts by weight per 100 parts by weight of component (A).

While the inventive composition is described as comprising components (A) to (D), there may be additionally compounded (E) an organopolysiloxane resin. Particularly when the curing agent (D) is a combination of a platinum catalyst with an organohydrogenpolysiloxane, the addition of the organopolysiloxane resin (E) results in a silicone coating film having a higher strength. Examples of the organopolysiloxane resin include resins consisting of $(CH_3)_3SiO_{1/2}$ units and $SiO_{4/2}$ units, resins consisting of $(CH_3)_3SiO_{1/2}$ units, $(CH_2=CH)SiO_{3/2}$ units and $SiO_{4/2}$ units, resins consisting of $(CH_2=CH)_3SiO_{3/2}$ units and $SiO_{4/2}$ units, and resins consisting of $(CH_2=CH)(CH_3)_2SiO_{1/2}$ units, $(CH_2=CH)SiO_{3/2}$ units and $SiO_{4/2}$ units. Of these, vinyl-containing resins are preferred. An appropriate amount of component (E) compounded is up to 100 parts by weight (i.e., 0 to 100 parts by weight), preferably 0.5 to 100 parts by weight, more preferably 1 to 50 parts by weight per 100 parts by weight of component (A).

In addition to the above-described components (A) to (D) or components (A) to (E), the inventive composition may further contain various additives. For example, reinforcing inorganic fillers such as fumed titanium dioxide, and non-reinforcing inorganic fillers such as crystalline silica, calcium silicate, titanium dioxide, ferric oxide and carbon black may be added. The amount of such inorganic filler used is usually 0 to 200 parts by weight per 100 parts by weight of all the components combined (exclusive of the inorganic filler).

To improve the dispersion of components (A) and (B), low-molecular weight organosilicon compounds, known as wetters, such as diorganopolysiloxane having hydroxyl groups at ends, diphenylsilane diol, hexaorganopolysiloxane, and organoalkoxysilane may be compounded in the composition.

In the application where a high degree of self adhesion is required, components having organic groups as typified by epoxy, (meth)acrylic and methoxysilyl groups or alkoxides or chelates of metals such as Ti, Zr and Sn may be added as an adhesive aid or tackifier.

There may be compounded heat resistance improvers including metal oxides such as iron oxide, cerium oxide, zinc oxide, and titanium oxide, cerium silanolate and cerium fatty acid salts. Also useful are platinum compounds such as platinic chloride, chloroplatinic acid, complexes of chloroplatinic acid hexahydrate with olefins or divinyldimethylpolysiloxane, and alcohol solutions of chloroplatinic acid hexahydrate, titanium oxide, flame retardants such as nitrogen-containing organic compounds, and pigments.

In the embodiment wherein a platinum group metal catalyst is used as the curing agent, reaction regulators as typified by vinylmethylcyclopolysiloxanes and acetylene alcohols may be added for controlled reaction. In the other embodiment wherein an organic peroxide is used as the curing agent, if an organic acid is generated, basic fillers as typified by carbonates, oxides and hydroxides of alkaline earth metals such as calcium, zinc and magnesium may be added for improving electrical properties.

Further, the composition may be diluted with an organic solvent for the purpose of dissolving the inventive composition for adjustment to an adequate viscosity to coat. Exemplary organic solvents include xylene, toluene, benzene, hexane, heptane, hexamethyldisiloxane and octamethylcyclotetrasiloxane.

The silicone rubber coating composition of the invention is generally prepared by intimately mixing components (A) and (B) or components (A), (B) and (E) on a rubber mill such as a twin-roll mill, Banbury mixer, dough mixer or kneader, adding components (C) and (D) thereto, and continuing mixing.

Using the inventive composition, a silicone rubber coating layer is formed on an airbag. The airbag may be of any well-known structure. The synthetic fiber base fabric of which the airbag is made may be selected from fabrics of polyamide fibers such as nylon 6, nylon 66 and nylon 46; aramide fibers such as copolymers of p-phenylene terephthalamide and all aromatic ethers; polyester fibers such as polyalkylene terephthalate; vinylon fibers, rayon fibers, polyolefin fibers, polyether imide fibers and carbon fibers.

Any customary technique may be used in applying the inventive silicone rubber coating composition to the airbag base fabric. The thickness (or coating weight) of the coating layer is preferably 5 to 300 g/m$^2$, more preferably 10 to 150 g/m$^2$. The composition is then cured in a known way under ordinary conditions, typically at a temperature of 80 to 250° C. for 1 to 30 minutes.

EXAMPLE

Examples and Comparative Examples are given below for illustrating the present invention although the invention is not limited thereto. All parts are by weight.

Preparation Example 1

Compound 1 was prepared by kneading 100 parts of an organopolysiloxane gum consisting of 99.850 molt of dimethylsiloxane units, 0.125 molt of methylvinylsiloxane units and 0.025 molt of dimethylvinylsiloxane units and having an average degree of polymerization of about 8,000, 40 parts of fumed silica having a specific surface area of 200 m$^2$/g (Aerosil 200 by Nippon Aerosil Co., Ltd.), and 10 parts of dimethylpolysiloxane having silanol groups at both ends and having an average degree of polymerization of 13 and a viscosity of 15 cS at 25° C. on a kneader, and heat treating the mixture at 180° C. for 3 hours.

Example 1

With stirring at room temperature, 30 parts of Compound 1 was dissolved in 70 parts of toluene. To 100 parts of this toluene solution, 1.0 part of a 50% silicone oil paste of p-methylbenzoyl peroxide as a curing agent and 0.5 part of N-allyl-N',N''-bis(3-trimethoxysilylpropyl)-isocyanurate were added, yielding silicone rubber coating composition No. 1.

Example 2

With stirring at room temperature, 30 parts of Compound 1 was dissolved in 70 parts of toluene. To 100 parts of this toluene solution, 1.0 part of a 50% silicone oil paste of p-methylbenzoyl peroxide as a curing agent and 0.5 part of 3-ureidopropyltrimethoxysilane were added, yielding silicone rubber coating composition No. 2.

Comparative Example 1

With stirring at room temperature, 30 parts of Compound 1 was dissolved in 70 parts of toluene. To 100 parts of this toluene solution, 1.0 part of a 50% silicone oil paste of p-methylbenzoyl peroxide as a curing agent and 0.5 part of 3-glycidoxypropyltrimethoxysilane were added, yielding silicone rubber coating composition No. 3.

Comparative Example 2

With stirring at room temperature, 30 parts of Compound 1 was dissolved in 70 parts of toluene. To 100 parts of this toluene solution, 1.0 part of a 50% silicone oil paste of p-methylbenzoyl peroxide as a curing agent and 0.5 part of 3-isocyanatopropyltriethoxysilane were added, yielding silicone rubber coating composition No. 4.

Example 3

With stirring at room temperature, 30 parts of Compound 1 was dissolved in 70 parts of toluene. To 100 parts of this toluene solution, a chloroplatinic acid/divinyltetramethyldisiloxane complex as a curing agent in an amount to give 30 ppm of platinum metal based on the total weight of all components, 0.05 part of 1-ethynylcyclohexan-1-ol, 1.5 parts of a dimethylsiloxane-methylhydrogensiloxane copolymer capped with trimethylsiloxy groups at both ends (Si—H: 0.015 mol/g), and 0.5 part of N-allyl-N',N''-bis(3-trimethoxysilylpropyl)isocyanurate were added, yielding silicone rubber coating composition No. 5.

Comparative Example 3

With stirring at room temperature, 30 parts of Compound 1 was dissolved in 70 parts of toluene. To 100 parts of this toluene solution, a chloroplatinic acid/divinyltetramethyldisiloxane complex as a curing agent in an amount to give 30 ppm of platinum metal based on the total weight of all components, 0.05 part of 1-ethynylcyclohexan-1-ol, 1.5 parts of a dimethylsiloxane-methylhydrogensiloxane copolymer capped with trimethylsiloxy groups at both ends (Si—H: 0.015 mol/g), and 0.5 part of 3-glycidoxypropyltrimethoxysilane were added, yielding silicone rubber coating composition No. 6.

The silicone rubber coating composition Nos. 1 to 6 each were uniformly applied onto nylon 66 fiber fabric (420 denier) so as to give a solid coating weight of 50 g/m$^2$, air dried at room temperature for 15 minutes, and vulcanized at 100° C. for 1 minutes and then at 180° C. for 3 minutes. The coated fabric was examined for adhesion by a Scott flexing test (2 kgf, 500 cycles). Additionally, the coated fabric was held under hot humid conditions: 80° C. and a humidity of 95% for 240 hours before it was examined for adhesion again by a Scott flexing test (2 kgf, 500 cycles). The results are shown in Table 1.

TABLE 1

| | Example | | | Comparative Example | | |
|---|---|---|---|---|---|---|
| Composition | 1 No. 1 | 2 No. 2 | 3 No. 5 | 1 No. 3 | 2 No. 4 | 3 No. 6 |
| Scott flexing test | | | | | | |
| Before hot humid holding | Pass | Pass | Pass | Pass | Pass | Pass |
| After hot humid holding | Pass | Pass | Pass | Rejected | Rejected | Rejected |

Preparation Example 2

Base 1 was prepared by kneading 85 parts of dimethylpolysiloxane capped with dimethylvinylsiloxy groups at both ends of the molecular chain having a viscosity of 1 Pa·s, 30 parts of fumed silica having a specific surface area of 300 m$^2$/g (Aerosil 300 by Nippon Aerosil Co., Ltd.), and 5 parts of hexamethyldisilazane as a dispersant on a kneader, heat treating the mixture at 150° C. for 3 hours, and admixing 60 parts of dimethylpolysiloxane capped with dimethylvinylsiloxy groups at both ends of the molecular chain having a viscosity of 1 Pa·s.

Example 4

To 100 parts of Base 1, a chloroplatinic acid/divinyltetramethyldisiloxane complex as a curing agent in an amount to give 30 ppm of platinum metal based on the total weight of all components, 0.05 part of 1-ethynylcyclohexan-1-ol, 10 parts of a dimethylsiloxane-methylhydrogensiloxane copolymer capped with trimethylsiloxy groups at both ends (Si—H: 0.007 mol/g), and 1.0 part of N,N'-diallyl-N"-(3-trimethoxysilylpropyl)isocyanurate were added, yielding silicone rubber coating composition No. 7.

Comparative Example 4

To 100 parts of Base 1, a chloroplatinic acid/divinyltetramethyldisiloxane complex as a curing agent in an amount to give 30 ppm of platinum metal based on the total weight of all components, 0.05 part of 1-ethynylcyclohexan-1-ol, 10 parts of a dimethylsiloxane-methylhydrogensiloxane copolymer capped with trimethylsiloxy groups at both ends (Si—H: 0.007 mol/g), and 1.0 part of 3-glycidoxypropyltrimethoxysilane were added, yielding silicone rubber coating composition No. 8.

The silicone rubber coating composition Nos. 7 and 8 were examined for adhesion by the same procedure as used for composition Nos. 1 to 6. The results are shown in Table 2.

Example 5

Base 2 was prepared by mixing 100 parts of a dimethylpolysiloxane capped with dimethylvinylsiloxy groups at both ends of the molecular chain having a viscosity of 100 Pa·s, 35 parts of a dimethylpolysiloxane capped with dimethylvinylsiloxy groups at both ends of the molecular chain having a viscosity of 5 Pa·s, 35 parts of an organopolysiloxane resin consisting of 39.5 mol % of $(CH_3)_3SiO_{1/2}$ units, 6.5 molt of $(CH_3)_2(CH_2=CH)SiO_{1/2}$ units, and 54 mol % of $SiO_2$ units, and 2 parts of hydrophobic silica treated with trimethylsilyl groups and having a specific surface area of 200 m$^2$/g.

To 100 parts of Base 2, a chloroplatinic acid/divinyltetramethyldisiloxane complex as a curing agent in an amount to give 30 ppm of platinum metal based on the total weight of all components, 0.05 part of 1-ethynylcyclohexan-1-ol, 15 parts of a dimethylsiloxane-methylhydrogensiloxane copolymer capped with trimethylsiloxy groups at both ends (Si—H: 0.007 mol/g), and 1.0 part of N,N'-diallyl-N"-(3-dimethoxymethylsilylpropyl)isocyanurate were added, yielding silicone rubber coating composition No. 9.

The silicone rubber coating composition No. 9 was examined for adhesion by the same procedure as used for composition Nos. 1 to 6. The results are shown in Table 2.

TABLE 2

| | Example | | Comparative Example |
|---|---|---|---|
| Composition | 4 No. 7 | 5 No. 9 | 4 No. 8 |
| Scott flexing test | | | |
| Before hot humid holding | Pass | Pass | Pass |
| After hot humid holding | Pass | Pass | Rejected |

Japanese Patent Application No. 2003-315024 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicone rubber coating composition for airbags, comprising
   (A) 100 parts by weight of a linear diorganopolysiloxane capped at both ends of its molecular chain with a triorganosiloxy group having an alkenyl group and containing an average of at least two alkenyl groups on the molecule,
   (B) 0.1 to 100 parts by weight of a finely divided silica having a specific surface area of at least 50 m$^2$/g,
   (C) 0.1 to 20 parts by weight of at least one compound selected from the group consisting of an organosilicon compound containing a ureido group on the molecule and a (partial) hydrolytic condensate thereof, and
   (D) an amount sufficient to cure the composition of a curing agent in the form of an organic peroxide or a combination of a platinum group metal catalyst and an organohydrogenpolysiloxane containing at least two silicon atom-bonded hydrogen atoms in the molecule.

2. The composition of claim 1, wherein in component (C), the organosilicon compound containing a ureido group is an organosilicon compound containing a ureido group and silicon atom-bonded alkoxy groups.

3. The composition of claim 1, wherein component (C) is at least one member selected from the group consisting of
   3-ureidopropyltrimethoxysilane,
   3-ureidopropyltriethoxysilane,
   3-ureidopropylmetbyldimethoxysilane, and partial hydrolytic condensates thereof.

* * * * *